(12) United States Patent
Chen

(10) Patent No.: US 12,543,103 B2
(45) Date of Patent: Feb. 3, 2026

(54) ACCESS CONTROL METHOD AND APPARATUS, AND COMMUNICATION DEVICE

(71) Applicant: VIVO MOBILE COMMUNICATION CO., LTD., Dongguan (CN)

(72) Inventor: Li Chen, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 388 days.

(21) Appl. No.: 18/159,883

(22) Filed: Jan. 26, 2023

(65) Prior Publication Data

US 2023/0180112 A1 Jun. 8, 2023

Related U.S. Application Data

(63) Continuation of application No. PCT/CN2021/109230, filed on Jul. 29, 2021.

(30) Foreign Application Priority Data

Jul. 31, 2020 (CN) .......................... 202010761899.4

(51) Int. Cl.
*H04W 48/16* (2009.01)
*H04W 36/08* (2009.01)
*H04W 56/00* (2009.01)

(52) U.S. Cl.
CPC .......... *H04W 48/16* (2013.01); *H04W 36/08* (2013.01); *H04W 56/0015* (2013.01)

(58) Field of Classification Search
CPC .. H04W 48/16; H04W 36/08; H04W 56/0015

USPC .......................................................... 370/329
See application file for complete search history.

(56) References Cited

U.S. PATENT DOCUMENTS

| 10,142,914 B2 | 11/2018 | Yang et al. |
| 2016/0353371 A1 | 12/2016 | Zhang et al. |
| 2019/0313260 A1 | 10/2019 | Zhang et al. |
| 2021/0352569 A1* | 11/2021 | Koskinen .............. H04W 48/12 |
| 2022/0264589 A1* | 8/2022 | Sun ....................... H04W 4/70 |
| 2022/0272581 A1 | 8/2022 | Liu |
| 2022/0279595 A1* | 9/2022 | Jang .................. H04W 74/0841 |
| 2022/0407655 A1 | 12/2022 | Liu et al. |

(Continued)

FOREIGN PATENT DOCUMENTS

| CN | 102118833 A | 7/2011 |
| CN | 102595604 A | 7/2012 |

(Continued)

OTHER PUBLICATIONS

China National Intellectual Property Administration, International Search Report issued in corresponding Application No. PCT/CN2021/109230, mailed Oct. 20, 2021.

*Primary Examiner* — Faisal Choudhury
(74) *Attorney, Agent, or Firm* — The Webb Law Firm

(57) ABSTRACT

This application discloses an access control method and apparatus, and a communication device. The method includes: receiving first information sent by a network device of a first cell; and performing a first operation according to the received first information, where the first operation includes any one of the following: determining whether the first cell supports a second-type terminal; or determining whether the first cell allows access or camping of a second-type terminal.

20 Claims, 4 Drawing Sheets

```
┌─────────────────────────────────────────────────────┐
│ Receive first information sent by a network device  │ ─── 201
│                   of a first cell                    │
└─────────────────────────────────────────────────────┘
                          │
                          ▼
┌─────────────────────────────────────────────────────┐
│ Perform a first operation according to the received │ ─── 202
│                  first information                   │
└─────────────────────────────────────────────────────┘
```

(56) References Cited

U.S. PATENT DOCUMENTS

| | | | |
|---|---|---|---|
| 2023/0075764 A1 | 3/2023 | Liu | |
| 2023/0104916 A1* | 4/2023 | Ohara | H04W 8/24 370/329 |
| 2023/0300786 A1* | 9/2023 | Zhang | H04W 72/51 455/458 |

FOREIGN PATENT DOCUMENTS

| | | |
|---|---|---|
| CN | 102761933 A | 10/2012 |
| CN | 104770012 A | 7/2015 |
| CN | 109151802 A | 1/2019 |
| CN | 110324822 A | 10/2019 |
| CN | 110463258 A | 11/2019 |
| CN | 110602731 A | 12/2019 |
| CN | 111345072 A | 6/2020 |
| CN | 111918359 A | 11/2020 |
| WO | 2021/146864 A1 | 7/2021 |

* cited by examiner

ACCESS CONTROL METHOD AND APPARATUS, AND COMMUNICATION DEVICE

CROSS-REFERENCE TO RELATED APPLICATIONS

This application is a continuation of International Application No. PCT/CN2021/109230, filed on Jul. 29, 2021, which claims priority to Chinese Patent Application No. 202010761899.4 filed on Jul. 31, 2020, which are incorporated herein by reference in their entireties.

TECHNICAL FIELD

This application relates to the field of communications technologies, and in particular, to an access control method and apparatus, and a communication device.

BACKGROUND

In the development of a new radio (NR), to adapt to different application scenarios and requirements, there are many different types of terminals. For example, lightweight terminals or other common terminals may be included. At present, the access control of lightweight terminals is basically the same as that of other common terminals. As a result, after the introduction of lightweight terminals, the access of a large number of lightweight terminals may have a large impact on the performance of other common terminals in the system.

SUMMARY

According to a first aspect of the present disclosure, an access control method is provided, applied to a terminal, the method including:
 receiving first information sent by a network device of a first cell; and
 performing a first operation according to the received first information, where the first operation includes any one of the following:
 determining whether the first cell supports a second-type terminal; or
 determining whether the first cell allows access or camping of a second-type terminal.

According to a second aspect of the present disclosure, an access control method is provided, applied to a network device, the method including:
 sending first information, where the first information is used by a terminal to perform a first operation, and the first operation includes at least one of the following:
 determining whether a first cell supports a second-type terminal, where the first cell is a cell to which the network device belongs; or
 determining whether the first cell allows access or camping of a second-type terminal.

According to a third aspect of the present disclosure, an access control apparatus is provided, including:
 a receiving module, configured to receive first information sent by a network device of a first cell; and
 a processing module, configured to perform a first operation according to the received first information, where the first operation includes any one of the following:
 determining whether the first cell supports a second-type terminal; or
 determining whether the first cell allows access or camping of a second-type terminal.

According to a fourth aspect of the present disclosure, an access control apparatus is provided, including:
 a sending module, configured to send first information, where the first information is used by a terminal to perform a first operation, and the first operation includes at least one of the following:
 determining whether a first cell supports a second-type terminal, where the first cell is a cell to which the access control apparatus belongs; or
 determining whether the first cell allows access or camping of a second-type terminal.

According to a fifth aspect of the present disclosure, a terminal is provided. The terminal includes a processor, a memory, and a program or instructions stored in the memory and runnable on the processor, the program or the instructions, when executed by the processor, implementing the steps of the method according to the first aspect.

According to a sixth aspect of the present disclosure, a network device is provided. The network device includes a processor, a memory, and a program or instructions stored in the memory and runnable on the processor, the program or the instructions, when executed by the processor, implementing the steps of the method according to the second aspect.

According to a seventh aspect of the present disclosure, a readable storage medium is provided, storing a program or instructions, the program or the instructions, when executed by a processor, implementing the steps of the method according to the first aspect or the steps of the method according to the second aspect.

According to an eighth aspect of the present disclosure, an embodiment of this application provides a chip, where the chip includes a processor and a communication interface, the communication interface is coupled to the processor, and the processor is configured to run a program or instructions of a network device to implement the method according to the second aspect.

DETAILED DESCRIPTION

The technical solutions in the embodiments of this application are clearly described in the following with reference to the accompanying drawings in the embodiments of this application. It is obvious that the embodiments to be described are only a part rather than all of the embodiments of this application. All other embodiments obtained by a person skilled in the art based on the embodiments of this application without creative efforts shall fall within the protection scope of this application.

The specification and claims of this application, and terms "first" and "second" are used to distinguish similar objects, but are not used to describe a specific sequence or order. It is to be understood that the data termed in this way are interchangeable in a proper case, so that the embodiments of this application can be implemented in other orders than the orders illustrated or described herein. Moreover, the objects distinguished by "first" and "second" are usually of one type, and the quantity of objects is not limited. For example, there may be one or more first objects. In addition, "and/or" in the description and claims represents at least one of connected objects, and the character "/" generally indicates an "or" relationship between associated objects.

It should be noted that the technologies described in the embodiments of this application are not limited to a long term evolution (LTE)/LTE-advanced (LTE-A) system, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may be used interchangeably in the embodiments of this application. The technology described in the present disclosure can be applied to the systems and radio technologies mentioned above, and can also be applied to other systems and radio technologies. However, the following description describes a new radio (NR) system for illustrative purposes, and NR terminology is used in most of the description below, although these technologies are also applicable to applications other than NR system applications, for example, the 6th generation (6G) communication system.

Figure 1:
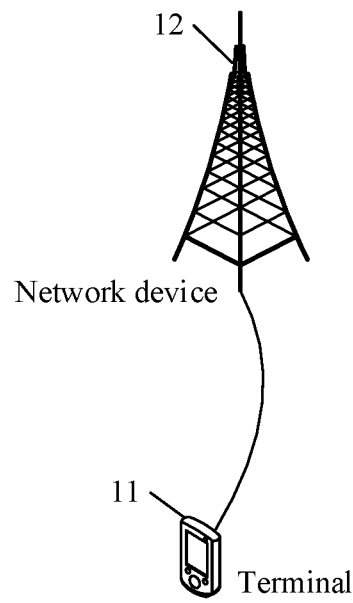
FIG. 1 is a structural diagram of a network system to which an embodiment of this application can be applied.

FIG. 1 is a block diagram of a wireless communication system to which an embodiment of this application can be applied. The communication system includes a terminal device 11 and a network device 12. The terminal 11 may be alternatively referred to as a terminal device or user equipment (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes: bracelets, earphones, glasses, and the like. It should be noted that, the specific type of the terminal 11 is not limited in this embodiment of this application. The network device 12 may be a base station or a core network, where the base station may be referred to as a Node B, an evolved Node B, an access point, a base transceiver station (BTS), a radio base station, a radio transceiver, a basic service set (BSS), an extended service set (ESS), a Node B, an evolved Node B (eNB), a Home Node B, a Home evolved Node B, a WLAN access point, a Wi-Fi Node, a transmitting receiving point (TRP), or another suitable term in the field. As long as the same technical effect is achieved, the base station is not limited to a specific technical vocabulary. It should be noted that, only a base station in an NR system is used as an example in the embodiments of this application, and the specific type of the base station is not limited.

For ease of understanding, some contents involved in the embodiments of this application are described below:
1. Lightweight Terminal.

A lightweight terminal may be referred to as a reduced capability User Equipment (RedCap UE), or a lightweight UE (light/lite UE), which is mainly applicable to a wearable device, an industrial sensor in the factory environment, or a video surveillance device, and is referred to as a second-type terminal in the following embodiments.

Such terminals usually refer to some devices with limited capabilities. The reduced capability is reflected in many aspects, such as lower device complexity, smaller device size, weaker processing power, and smaller or fewer features that can be supported. The supported performance can be understood as at least one of the following: a quantity of supported carrier aggregations CCs, a quantity of supported receiving antennas, a maximum supported bandwidth, a supported peak rate, or the like.
2. Common Terminal.

A common terminal can be understood as a non-lightweight terminal, or a terminal of a common type defined in Rel15 or Rel16, which is referred to as a first-type terminal in the following embodiments.
3. The Basic Process of Common Terminal System Access.

1. Initial network search: including synchronization signal block (SSB) synchronization and reception of system information. Alternatively, primary synchronization information PSS is received first, secondary synchronization information (SSS) is then received, and a PBCH is received: obtaining an SSB index, and a physical broadcast channel (Physical broadcast channel Demodulation Reference Signal, PBCH DMRS) and information in a master information block (MIB).

2. Receive broadcast system information (SI) according to the obtained information, including information required for accessing the system.

3. Perform random access according to the information required for system access obtained above.

An access control method provided in the embodiments of this application is described in detail below with reference to the accompanying drawings by using specific embodiments and application scenarios.

Figure 2:
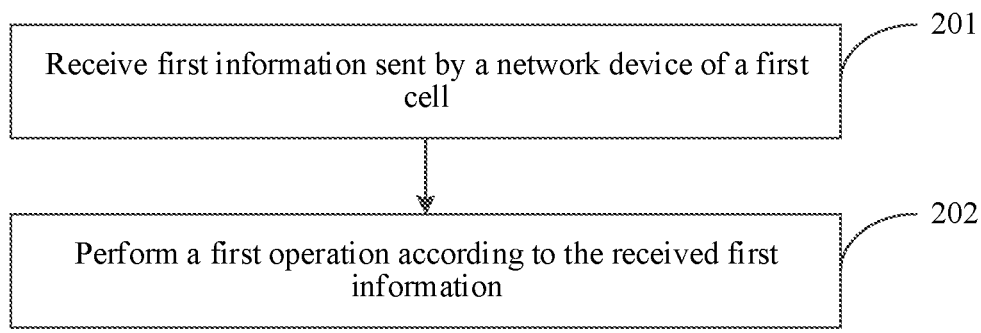
FIG. 2 is a flowchart of an access control method according to an embodiment of this application.

Referring to FIG. 2, FIG. 2 is a flowchart of an access control method according to an embodiment of this application. The method is applied to a terminal. As shown in FIG. 2, the method includes the following steps:

Step 201: Receive first information sent by a network device of a first cell.

Step 202: Perform a first operation according to the received first information, where the first operation includes any one of the following:

determining whether the first cell supports a second-type terminal; or determining whether the first cell allows access or camping of a second-type terminal.

In this embodiment, the provided access control method is mainly applied to the terminal, and is used for controlling the access to the cell in an initial access process or a cell handover process of the terminal. Further, it can be understood that the terminal currently selects the cell to access. In the handover process, the first cell may be understood as a neighboring cell.

Alternatively, the neighboring cell may send the first information in the form of broadcasting, and the terminal may obtain the first information in the process of initial network search, or may obtain the first information in the process of receiving broadcast system information. After obtaining the first information sent by the first cell (a neighboring cell), the terminal may determine, based on the first information, whether the first cell supports a second-type terminal, and may further determine whether the first cell allows access or camping of a second-type terminal. In this way, the terminal can determine whether to access the first cell based on the first information.

It should be understood that, in an embodiment, cell selection or re-selection may be performed in a case that it is determined that the first cell does not support a second-type terminal or the first cell does not allow camping or access of a second-type terminal.

In the embodiments of this application, the terminal receives first information sent by a network device of a first cell; and determines, according to the first information, whether the first cell supports a second-type terminal and/or whether the first cell allows access or camping of a second-type terminal, thereby implementing access control of the second-type terminal. Therefore, the embodiments of this application can reduce the impact of the access of the second-type terminal on the performance of the common terminal.

Optionally, in an embodiment, the first information may include at least one of the following:
 a second synchronization signal block SSB corresponding to the second-type terminal, where the second SSB is configured for synchronization of the second-type terminal, and the second SSB is different from a first SSB corresponding to a first-type terminal;
 an extended information field or a reserved information field in a first main information block MIB, where the first MIB is a MIB corresponding to a first-type common terminal;
 extended system information;
 a second SIB1 in a second system information block (SIB), where the second SIB1 is configured to carry system information required by a second-type terminal to access a cell in which the second-type terminal is located, and the second SIB is a SIB corresponding to the second-type terminal; or
 target indication information.

In this embodiment, the first-type terminal may be understood as a common terminal, and may also be referred to as a first-type common terminal. The first SSB may be understood as an existing SSB, which is configured for SSB synchronization for the first-type terminal. The second-type terminal may be understood as a reduced capability User Equipment, and the second SSB may be understood as a newly added SSB, which is configured for SSB synchronization for the second-type terminal.

Optionally, in an embodiment, when the first information includes the second SSB, in a case that the first cell supports a second-type terminal or allows access or camping of a second-type terminal, the network device of the first cell sends the second SSB. Correspondingly, when the terminal receives the second SSB, the terminal may consider that the first cell supports a second-type terminal, or may consider that the first cell allows access or camping of a second-type terminal. Certainly, in another embodiment, information carried in the second SSB may be further used to implicitly or explicitly indicate at least one of the following: whether the first cell supports a second-type terminal; or whether the first cell allows access or camping of a second-type terminal.

Optionally, in an embodiment, when the first information includes the first MIB, in a case that the first cell supports a second-type terminal or allows access or camping of a second-type terminal, the first cell may implicitly or explicitly indicate, through information carried in the extended information field or the reserved information field in the first MIB, at least one of the following: whether the first cell supports a second-type terminal; or whether the first cell allows access or camping of a second-type terminal.

Optionally, in an embodiment, when the first information includes the extended system information, in a case that the first cell supports a second-type terminal or allows access or camping of a second-type terminal, the first cell may implicitly or explicitly indicate, through information carried in the extended system information, at least one of the following: whether the first cell supports a second-type terminal; or whether the first cell allows access or camping of a second-type terminal.

Optionally, in an embodiment, when the first information includes the second SIB1, in a case that the first cell supports a second-type terminal or allows access or camping of a second-type terminal, the network device of the first cell may send the second SIB1. Correspondingly, when the terminal receives the second SIB1, the terminal may consider that the first cell supports a second-type terminal, or may consider that the first cell allows access or camping of a second-type terminal. Certainly, in another embodiment, information carried in the second SIB1 may be further used to implicitly or explicitly indicate at least one of the following: whether the first cell supports a second-type terminal; or whether the first cell allows access or camping of a second-type terminal.

Optionally, when the first information includes the target indication information, the first cell may implicitly or explicitly indicate, through the target indication information, at least one of the following: whether the first cell supports a second-type terminal; or whether the first cell allows access or camping of a second-type terminal.

It should be noted that, when the first information includes the foregoing plurality of types of information, the indication may be performed only through a certain type of information, or a joint indication may be performed through the plurality of types of information, which is not further limited herein.

The extended system information includes at least one of the following:
 system information corresponding to the second-type terminal in the first SIB1, where the first SIB1 belongs to a first SIB, and the first SIB is a SIB corresponding to the first-type terminal;
 system information corresponding to the second-type terminal in a SIBx, where x is an integer greater than 1, the SIBx belongs to the second SIB, and in this example, the SIBx is a newly added SIB based on the existing SIB; or
 system information corresponding to the second-type terminal in a SIBy, where y is an integer greater than 1, and the SIBy belongs to the first SIB. In this example, the SIBy is a newly added extended information field (IE) in an existing SIB, and the extended information field includes system information related to the second-type terminal.

In this embodiment, the first SIB1 may be referred to as SIB1-extend, which is extended based on the conventional SIB1 with an additional SIB1 system message for indicating support for a second-type terminal or allowing of access of a second-type terminal. In other words, the system information corresponding to the second-type terminal in the first SIB1 is used for indicating any one of the following:
 system information supporting the second-type terminal; or
 system information allowing access or camping of the second-type terminal.

The terminal may determine, based on the system information corresponding to the second-type terminal, at least one of the following: whether the first cell supports a second-type terminal; or whether the first cell allows access or camping of a second-type terminal.

The SIBx may be understood as another SIB except the second SIB1 in newly added second SIBs, which may be configured to carry the system information corresponding to the second-type terminal. The system information may implicitly or explicitly indicate at least one of the following: whether the first cell supports a second-type terminal; or whether the first cell allows access or camping of a second-type terminal.

The SIBy may be understood as a SIB obtained through extension based on a SIB after the conventional first SIB1, for example, a SIB obtained through extension based on a specific SIB in the conventional SIB2, SIB3, SIB4, . . . , and SIBn. The SIBy may be referred to as SIB2-light, SIB3-light, SIB4-light, . . . , or SIBn-light. The SIBy includes system information required for the second-type terminal to access or camp on the first cell, and the system information may implicitly or explicitly indicate at least one of the following: whether the first cell supports a second-type terminal; or whether the first cell allows access or camping of a second-type terminal.

Optionally, the system information corresponding to the second-type terminal in the SIBx and the SIBy is used for indicating system information required by the second-type terminal to access or camp on the cell in which the second-type terminal is located.

In an embodiment, when the SIBx or the SIBy indicates the system information required by the second-type terminal to access or camp on the cell in which the second-type terminal is located, it may be understood by the terminal that the first cell supports a second-type terminal; or it may be understood that the first cell allows access or camping of a second-type terminal, and an access or camping process may be performed in this case. Certainly, in another embodiment, the SIBx or the SIBy may further include other indication identifiers for indicating at least one of the following: whether the first cell supports a second-type terminal; or whether the first cell allows access or camping of a second-type terminal.

It should be noted that, the values of x and y may be indicated by part of information elements (IE) of the conventional SIB1 message.

Optionally, in an embodiment, the target indication information is used for indicating at least one of the following:
whether to allow camping or access of the second-type terminal;
whether to allow camping or access of a terminal of a preset category;
whether to allow camping or access of a terminal of a preset type;
whether to allow camping or access of a second-type terminal in a preset application scenario;
whether to allow camping or access of a second-type terminal with preset subscription information;
whether to allow camping or access of a target terminal, where the target terminal is a terminal with a preset capability, a preset capability set, a preset function, or a preset function set;
random access channel (Random Access Channel, RACH) related configuration information of a second-type terminal;
access control related configuration information of a second-type terminal;
whether to support an extended discontinuous reception (eDRX) function;
search space (Search space) related configuration information of a second-type terminal;
control resource set (CORESET) related configuration information of a second-type terminal;
reference Information related configuration information of a second-type terminal; or
cell selection and re-selection related configuration information of a second-type terminal.

In this embodiment, the target information may include one or more pieces of information, where each piece of information is used for indicating any one of the above. For example, in the target information, first indication information may be used to indicate whether to allow camping or access of the second-type terminal, and second indication information may be used to indicate whether to allow camping or access of a terminal of a preset category. Certainly, for the indication of the related configuration information, the configuration content may be directly indicated, or configuration-related identifiers may be indicated through the indication information, which is not further limited herein.

The classification of the terminal may be referred to as a terminal type (UE category), which, for example, may include a personal user terminal or a factory terminal. The type of the terminal may be referred to as a UE type, which, for example, may include the foregoing first-type terminal and second-type terminal. The application scenario of the terminal may be referred to as a Use case. The subscription information of the terminal may be referred to as Subscription. In this embodiment, the UE category may be defined according to a feature set (feature set), a capability set (capability set), or different data rates (data rate). Different UE types may be defined according to a feature set, a capability set, or different data rates. Optionally, for different types, even the same category may correspond to different types, such as a high-end UE (high end UE) and a low-end UE (low end UE). For different use cases, different categories or different types may correspond to different application scenarios, or terminals of the same type or the same category may be used in different application scenarios, such as wearable devices (wearable) for personal services and industry sensors (industry sensor) in the industrial field. For the low end UE, a distinction can also be made between low end wearable devices (low end wearable) and low end industry sensors (Low end industry sensor). The subscription generally refers to subscription information (subscription information) of the UE, such as the corresponding subscription information of the operator in the SIM card, including at least one of the following: a SIM card type, a SIM card service type, SIM card tariff information, a SIM card priority, a customer level of the operator, or the like. Different initial access resources may be configured to correspond to different subscription information.

It should be noted that, the target indication information may indicate whether to allow camping or access of a second-type terminal that meets specific rules. For example, the target indication information may indicate whether to allow camping or access of a second-type terminal in a specific application scenario and/or with specific subscription information.

The RACH related configuration information may include a preamble (preamble), RACH resources, and the like.

The access control related configuration information may include access control (AC).

The search space related configuration information may include configuring a separate search space for the second-type terminal.

The CORESET related configuration information may include configuring a separate CORESET for the second-type terminal.

The reference information related configuration information may include configuring a separate reference signal for the second-type terminal.

In this embodiment, the target terminal is a terminal with a preset capability, a preset capability set, a preset function, or a preset function set, which may be understood as that a target object of the target terminal satisfies a preset condition, where the target object includes at least one of a bandwidth, a quantity of antennas, a peak rate, processing delay, a quantity of carriers, or a transmit power.

For example, in an embodiment, the target indication information may be used to indicate camping or access of the second-type terminal that satisfies the preset condition. Optionally, the preset condition may be at least one of the following:

a bandwidth capability is less than 100 MHz;
an antenna quantity capability is less than 4 or equal to 2 or equal to 1;
a peak rate capability is less than 100 Mbps, or a processing delay capability is less than a preset time;
a supported carrier quantity capability is less than a specific value; or
a transmit power capability is less than a specific value.

Optionally, in an embodiment, the target indication information may be carried in a physical broadcast channel PBCH, a MIB message, a SIB message, or the extended system information.

It should be understood that, in this embodiment of this application, the first-type terminal and the second-type terminal may use the same SSB for synchronization, or may use different SSBs for synchronization.

In an embodiment, in a case that the second-type terminal and the first-type terminal use a same SSB for synchronization, and the first information is the extended system information, the receiving first information sent by a network device of a first cell includes:

receiving the extended system information after receiving the SSB for synchronization, where
after the performing a first operation according to the received first information, the method further includes at least one of the following:
performing, in a case that it is determined according to the extended system information that the first cell does not support a second-type terminal or does not allow camping or access of a second-type terminal, cell selection or re-selection, or prohibiting access to the first cell; or
performing, in a case that it is determined according to the extended system information that the first cell supports a second-type terminal or allows camping or access of a second-type terminal, cell camping or access.

It should be understood that, in this embodiment, the receiving the extended system information after receiving the SSB for synchronization may be understood as: the SSB is received first; after the SSB is received, synchronization is performed based on the received SSB; and after synchronization is performed, the extended system information is received.

The receiving the extended system information may be understood as receiving the first SIB and/or the SIBy, where the first SIB and the SIBy include system information corresponding to the second-type terminal.

In another embodiment, the second-type terminal and the first-type terminal use different SSBs for synchronization. For example, in a case that the first information includes the second SSB and target information, the receiving first information sent by a network device of a first cell includes:

receiving the second SSB; and
receiving target information after receiving the second SSB for synchronization, where the target information includes at least one of the following:
the extended information field or the reserved information field in the first MIB; or
the second SIB, where
after the performing a first operation according to the received first information, the method further includes at least one of the following:
performing, in a case that it is determined according to a system message corresponding to the target information that the first cell does not support a second-type terminal or does not allow camping or access of a second-type terminal, cell selection or re-selection, or prohibiting access to the first cell; or
performing, in a case that it is determined according to the system message corresponding to the target information that the first cell supports a second-type terminal or allows camping or access of a second-type terminal, cell camping or access.

It should be understood that when the first-type terminal receives the first information, camping and access may be performed according to the normal process; and when the second-type terminal receives the first information, restricted access may be performed according to the first information. When the second-type terminal does not receive the first information, restricted access may be performed according to specific rules, thereby further preventing the access of the second-type terminal from affecting the performance of the first-type terminal. For example, in a case that the terminal is a second-type terminal, the method further includes:

performing a second operation in a case that part or all of the first information is not received, where
the second operation includes at least one of the following:
prohibiting access to the first cell or prohibiting access to the first cell within a preset time;
skipping accessing the first cell or disallowing an access attempt for the first cell;
performing cell selection or re-selection; or
skipping camping on the first cell.

Figure 3:
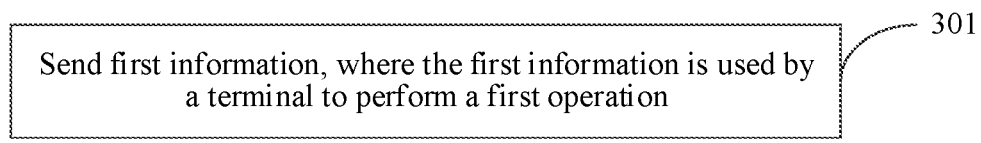
FIG. 3 is a flowchart of another access control method according to an embodiment of this application.

Referring to FIG. 3, FIG. 3 is a flowchart of another access control method according to an embodiment of this application. The method is applied to a network device. As shown in FIG. 3, the method includes the following steps:

Step 301: Send first information, where the first information is used by a terminal to perform a first operation, and the first operation includes at least one of the following:

determining whether a first cell supports a second-type terminal, where the first cell is a cell to which the network device belongs; or
determining whether the first cell allows access or camping of a second-type terminal.

Optionally, the first information includes at least one of the following:

a second synchronization signal block SSB corresponding to the second-type terminal, where the second SSB is configured for synchronization of the second-type terminal, and the second SSB is different from a first SSB corresponding to a first-type terminal;

an extended information field or a reserved information field in a first main information block MIB, where the first MIB is a MIB corresponding to a first-type common terminal;

extended system information;

a second SIB1 in a second system information block SIB, where the second SIB1 is configured to carry system information required by a second-type terminal to access a cell in which the second-type terminal is located, and the second SIB is a SIB corresponding to the second-type terminal; or target indication information.

Optionally, the extended system information includes at least one of the following:

system information corresponding to the second-type terminal in the first SIB1, where the first SIB1 belongs to a first SIB, and the first SIB is a SIB corresponding to the first-type terminal;

system information corresponding to the second-type terminal in a SIBx, where x is an integer greater than 1, and the SIBx belongs to the second SIB; or system information corresponding to the second-type terminal in a SIBy, where y is an integer greater than 1, and the SIBy belongs to the first SIB.

Optionally, the system information corresponding to the second-type terminal in the first SIB1 is used for indicating any one of the following:

system information supporting the second-type terminal; or system information allowing access or camping of the second-type terminal.

Optionally, the system information corresponding to the second-type terminal in the SIBx and the SIBy is used for indicating system information required by the second-type terminal to access or camp on the cell in which the second-type terminal is located.

Optionally, the target indication information is used for indicating at least one of the following:

whether to allow camping or access of the second-type terminal;

whether to allow camping or access of a terminal of a preset category;

whether to allow camping or access of a terminal of a preset type;

whether to allow camping or access of a second-type terminal in a preset application scenario;

whether to allow camping or access of a second-type terminal with preset subscription information;

whether to allow camping or access of a target terminal, where the target terminal is a terminal with a preset capability, a preset capability set, a preset function, or a preset function set;

random access channel RACH related configuration information of a second-type terminal;

access control related configuration information of a second-type terminal;

whether to support an extended discontinuous reception eDRX function;

search space related configuration information of a second-type terminal;

control resource set related configuration information of a second-type terminal;

reference Information related configuration information of a second-type terminal; or cell selection and re-selection related configuration information of a second-type terminal.

Optionally, a target object of the target terminal satisfies a preset condition, where the target object includes at least one of a bandwidth, a quantity of antennas, a peak rate, processing delay, a quantity of carriers, or a transmit power.

Optionally, the target indication information is carried in a physical broadcast channel PBCH, a MIB message, a SIB message, or the extended system information.

Optionally, the second-type terminal is a reduced capability User Equipment.

It should be noted that, this embodiment is an implementation of a corresponding network device in the embodiment shown in FIG. 2. For a specific implementation of this embodiment, reference may be made to related descriptions in the embodiment shown in FIG. 2, and the same beneficial effects are achieved. To avoid repeated descriptions, details are not described herein again.

It should be noted that, for the access control method provided in the embodiments of this application, the execution entity may be an access control apparatus, or a control module in the access control apparatus for performing the access control method. In this embodiment of this application, the access control apparatus provided in the embodiments of this application is described by taking the access control method performed by the access control apparatus as an example.

Figure 4:
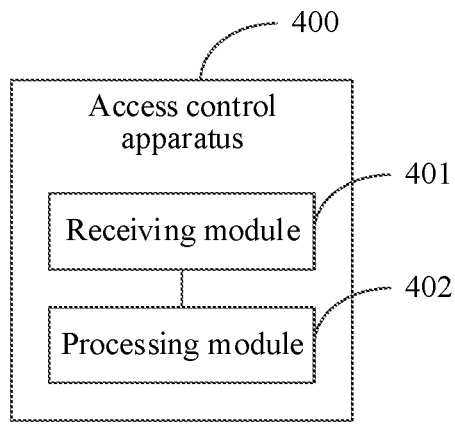
FIG. 4 is a structural diagram of an access control apparatus according to an embodiment of this application.

Referring to FIG. 4, FIG. 4 is a structural diagram of an access control apparatus according to an embodiment of this application. Referring to FIG. 4, the access control apparatus 400 includes:

a receiving module 401, configured to receive first information sent by a network device of a first cell; and a processing module 402, configured to perform a first operation according to the received first information, where the first operation includes any one of the following:

determining whether the first cell supports a second-type terminal; or determining whether the first cell allows access or camping of a second-type terminal.

Optionally, the first information includes at least one of the following:

a second synchronization signal block SSB corresponding to the second-type terminal, where the second SSB is configured for synchronization of the second-type terminal, and the second SSB is different from a first SSB corresponding to a first-type terminal;

an extended information field or a reserved information field in a first main information block MIB, where the first MIB is a MIB corresponding to a first-type common terminal;

extended system information;

a second SIB1 in a second system information block SIB, where the second SIB1 is configured to carry system information required by a second-type terminal to access a cell in which the second-type terminal is located, and the second SIB is a SIB corresponding to the second-type terminal; or target indication information.

Optionally, the extended system information includes at least one of the following:

system information corresponding to the second-type terminal in the first SIB1, where the first SIB1 belongs to a first SIB, and the first SIB is a SIB corresponding to the first-type terminal;

system information corresponding to the second-type terminal in a SIBx, where x is an integer greater than 1, and the SIBx belongs to the second SIB; or system information corresponding to the second-type terminal in a SIBy, where y is an integer greater than 1, and the SIBy belongs to the first SIB.

Optionally, the system information corresponding to the second-type terminal in the first SIB1 is used for indicating any one of the following:

system information supporting the second-type terminal; or system information allowing access or camping of the second-type terminal.

Optionally, the system information corresponding to the second-type terminal in the SIBx and the SIBy is used for indicating system information required by the second-type terminal to access or camp on the cell in which the second-type terminal is located.

Optionally, the target indication information is used for indicating at least one of the following:

whether to allow camping or access of the second-type terminal;

whether to allow camping or access of a terminal of a preset category;

whether to allow camping or access of a terminal of a preset type;

whether to allow camping or access of a second-type terminal in a preset application scenario;

whether to allow camping or access of a second-type terminal with preset subscription information;

whether to allow camping or access of a target terminal, where the target terminal is a terminal with a preset capability, a preset capability set, a preset function, or a preset function set;

random access channel RACH related configuration information of a second-type terminal;

access control related configuration information of a second-type terminal;

whether to support an extended discontinuous reception eDRX function;

search space related configuration information of a second-type terminal;

control resource set related configuration information of a second-type terminal;

reference Information related configuration information of a second-type terminal; or cell selection and re-selection related configuration information of a second-type terminal.

Optionally, a target object of the target terminal satisfies a preset condition, where the target object includes at least one of a bandwidth, a quantity of antennas, a peak rate, processing delay, a quantity of carriers, or a transmit power.

Optionally, the target indication information is carried in a physical broadcast channel PBCH, a MIB message, a SIB message, or the extended system information.

Optionally, in a case that the second-type terminal and the first-type terminal use a same SSB for synchronization, and the first information is the extended system information, the receiving module 401 is further configured to: receive the extended system information after receiving the SSB for synchronization, where after the performing a first operation according to the received first information, the processing module 402 is further configured to perform at least one of the following:

performing, in a case that it is determined according to the extended system information that the first cell does not support a second-type terminal or does not allow camping or access of a second-type terminal, cell selection or re-selection, or prohibiting access to the first cell; or performing, in a case that it is determined according to the extended system information that the first cell supports a second-type terminal or allows camping or access of a second-type terminal, cell camping or access.

Optionally, in a case that the first information includes the second SSB and target information, the receiving module 401 is further configured to: receive the second SSB; and receive target information after receiving the second SSB for synchronization, where the target information includes at least one of the following:

the extended information field or the reserved information field in the first MIB; or the second SIB, where after the performing a first operation according to the received first information, the processing module 402 is further configured to perform at least one of the following:

performing, in a case that it is determined according to a system message corresponding to the target information that the first cell does not support a second-type terminal or does not allow camping or access of a second-type terminal, cell selection or re-selection, or prohibiting access to the first cell; or performing, in a case that it is determined according to the system message corresponding to the target information that the first cell supports a second-type terminal or allows camping or access of a second-type terminal, cell camping or access.

Optionally, in a case that the terminal is a second-type terminal, the processing module 402 is further configured to: perform a second operation in a case that part or all of the first information is not received, where the second operation includes at least one of the following:

prohibiting access to the first cell or prohibiting access to the first cell within a preset time;

skipping accessing the first cell or disallowing an access attempt for the first cell;

performing cell selection or re-selection; or skipping camping on the first cell.

Optionally, the second-type terminal is a reduced capability User Equipment.

The terminal provided in this embodiment of this application can implement the processes in the method embodiment of FIG. 2. To avoid repetition, details are not described herein again.

Figure 5:
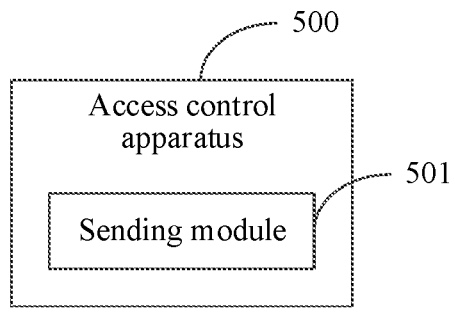
FIG. 5 is a structural diagram of another access control apparatus according to an embodiment of this application.

Referring to FIG. 5, FIG. 5 is a structural diagram of an access control apparatus according to an embodiment of this application. Referring to FIG. 5, the access control apparatus 500 includes:

a sending module 501, configured to send first information, where the first information is used by a terminal to perform a first operation, and the first operation includes at least one of the following:

determining whether a first cell supports a second-type terminal, where the first cell is a cell to which the access control apparatus belongs; or determining whether the first cell allows access or camping of a second-type terminal.

The access control apparatus provided in this embodiment of this application can implement the processes in the method embodiment of FIG. 3. To avoid repetition, details are not described herein again.

The access control apparatus in this embodiment of this application may be an apparatus, or may be a component, an integrated circuit, or a chip in a terminal. The apparatus may be a mobile terminal or may be a non-mobile terminal. For example, the mobile terminal may include, but is not limited to, the types of the terminal 11 listed above, and the non-mobile terminal may be a server, a network attached storage (NAS), a personal computer (PC), a television (TV), a teller machine, a self-service machine, or the like. This is not specifically limited in this embodiment of this application.

The access control apparatus in the embodiments of this application may be an apparatus having an operating system. The operating system may be an Android operating system, may be an ios operating system, or may be another possible operating system, and is not specifically limited in the embodiments of this application.

The access control apparatus provided in the embodiments of this application can implement the processes implemented in the method embodiment of FIG. 3, and achieve the same technical effects. To avoid repetition, details are not described herein again.

Figure 6:
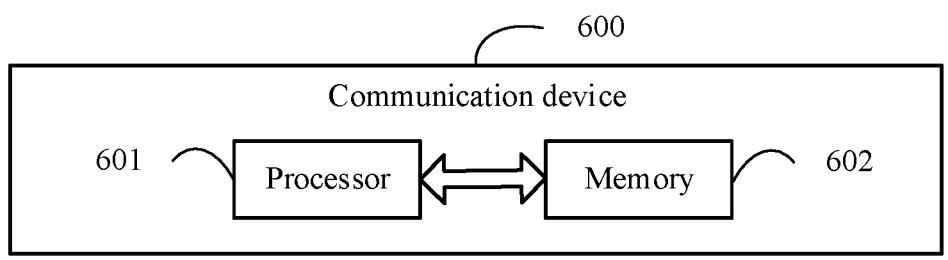
FIG. 6 is a structural diagram of a communication device according to an embodiment of this application.

Optionally, as shown in FIG. 6, the embodiments of this application further provide a communication device 600, including a processor 601, a memory 602, and a program or instructions stored in the memory 602 and runnable on the processor 601. For example, the communication device 600 is a terminal. The program or the instructions, when executed by the processor 601, implement the processes of the embodiments of the access control method, and can achieve the same technical effects. When the communication device 600 is a network device, the program or the instructions, when executed by the processor 601, implement the processes of the embodiments of the access control method, and can achieve the same technical effects. To avoid repetition, details are not described herein again.

Figure 7:
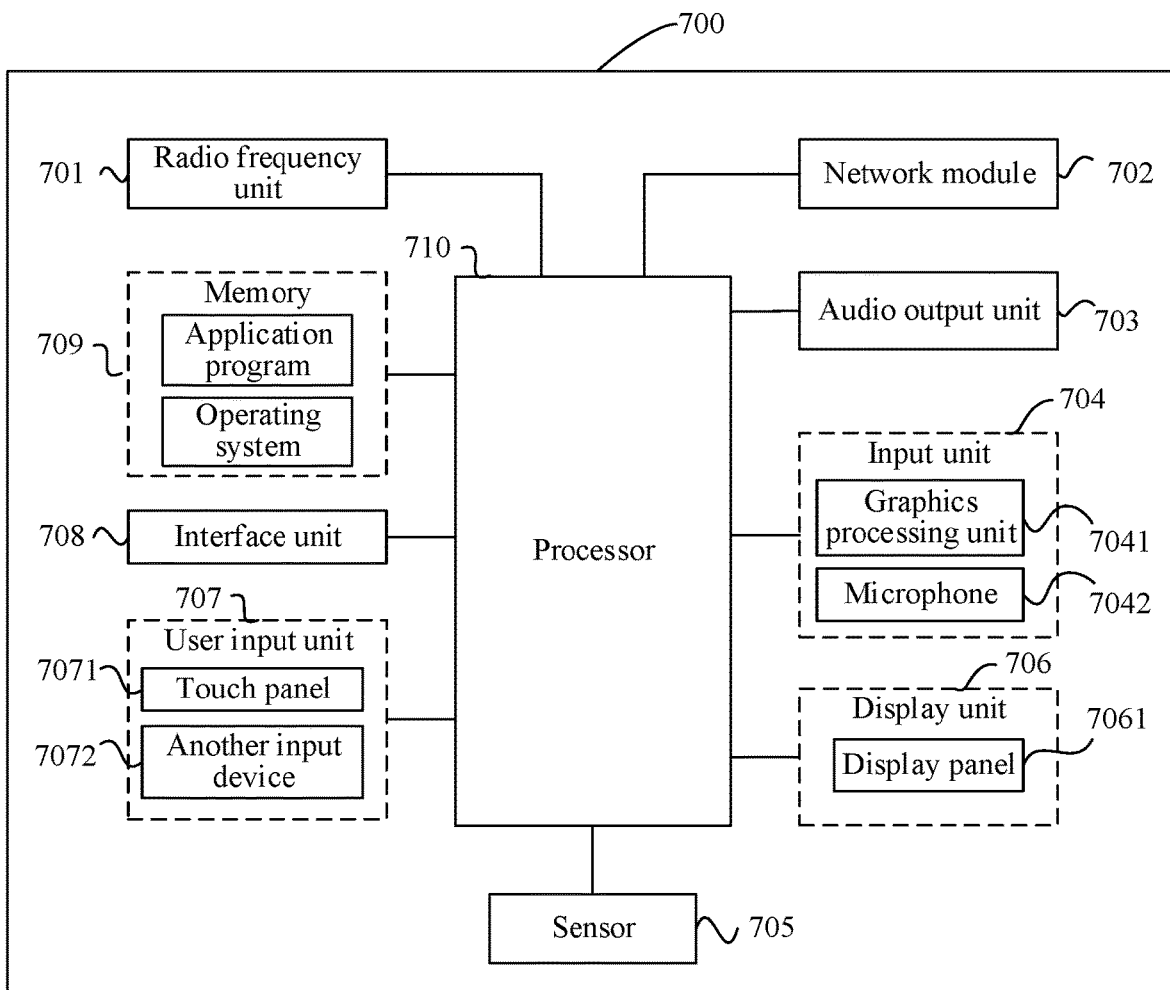
FIG. 7 is a structural diagram of a terminal according to an embodiment of this application.

FIG. 7 is a schematic structural diagram of hardware of a terminal for implementing embodiments of this application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include the power supply (for example, a battery) for supplying power to the components. The power supply may be logically connected to the processor 710 by using a power management system, thereby implementing functions such as charging, discharging, and power consumption management by using the power management system. A terminal structure shown in FIG. 7 does not constitute a limitation to the terminal, and the terminal may include more or fewer components than those shown in the figure, or some components may be combined, or a different component deployment may be used. Details are not described herein again.

It should be understood that in the embodiments of this application, the input unit 704 may include a graphics processing unit (GPU) 7041 and a microphone 7042, and the graphics processing unit 7041 processes image data of still images or videos obtained by an image capture device (for example, a camera) in a video capture mode or an image capture mode. The display unit 706 may include a display panel 7061, and the display panel 7061 may be configured in a form such as a liquid crystal display or an organic light-emitting diode. the user input unit 707 includes a touch panel 7071 and another input device 7072. The touch panel 7071 is also referred to as a touchscreen. The touch panel 7071 may include two parts: a touch detection apparatus and a touch controller. the another input device 7072 may include, but is not limited to, a physical keyboard, a func-tional key (such as a volume control key or a switch key), a track ball, a mouse, and a joystick, which are not repeated herein.

In this embodiment of this application, after the radio frequency unit 701 receives downlink data from a network device, the downlink data is processed by the processor 710. In addition, uplink data is sent to the network device. Generally, the radio frequency unit 701 includes, but is not limited to, an antenna, at least one amplifier, a transceiver, a coupler, a low noise amplifier, a duplexer, and the like.

The memory 709 may be configured to store software programs or instructions, and various pieces of data. The memory 709 may mainly include a program or instruction storage area and a data storage area. The program or instruction storage area may store an operating system, an application program or instruction required by at least one function (for example, a sound playing function and an image playing function), or the like. In addition, the memory 709 may include a high-speed random access memory, and may further include a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM) or a flash memory. The memory may include, for example, at least one magnetic disk storage device, a flash memory, or other volatile solid-state storage devices.

The processor 710 may include one or more processing units. Optionally, the processor 710 may integrate an application processor and a modem processor. The application processor mainly processes an operating system, a user interface, an application program or instruction, and the like. The modem processor mainly processes wireless communication, and may be, for example, a baseband processor. It may be understood that the foregoing modem processor may either not be integrated into the processor 710.

The radio frequency unit 701 is configured to receive first information sent by a network device of a first cell; and
the processor 710 is configured to perform a first operation according to the received first information, where the first operation includes any one of the following:
determining whether the first cell supports a second-type terminal; or
determining whether the first cell allows access or camping of a second-type terminal.

It should be understood that, in this embodiment, the processor 710 and the radio frequency unit 701 can implement the processes in the method embodiment of FIG. 2. To avoid repetition, details are not described herein again.

Figure 8:
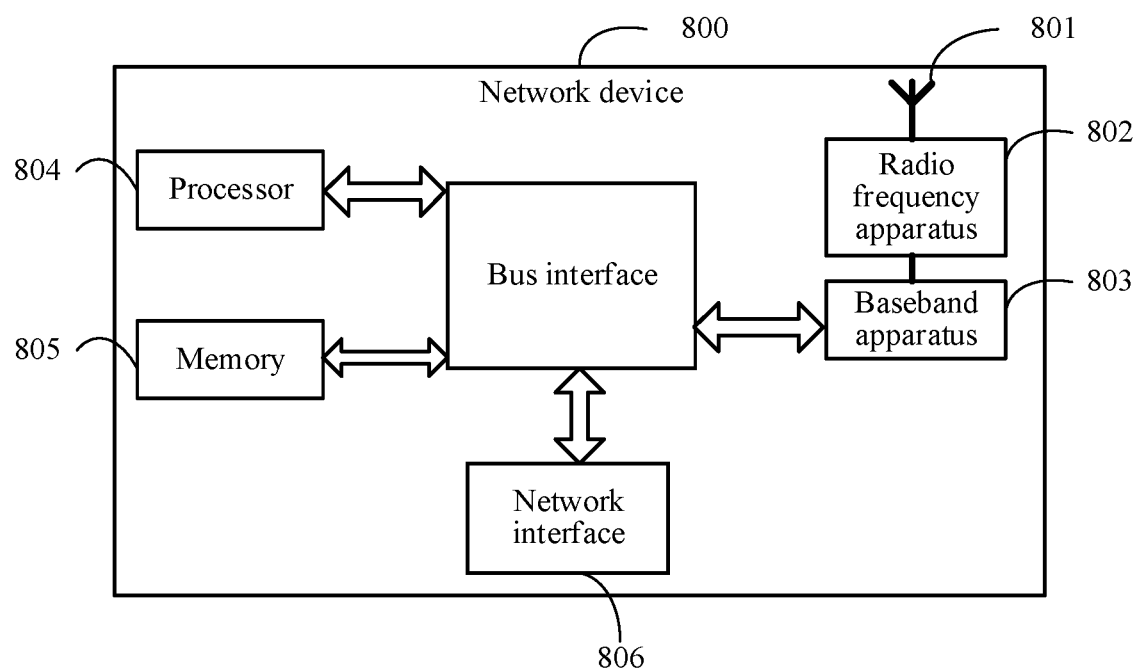
FIG. 8 is a structural diagram of a network device according to an embodiment of this application.

Alternatively, an embodiment of this application further provides a network device. As shown in FIG. 8, the network device 800 includes: an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information to be sent, and sends the information to the radio frequency apparatus 802. The radio frequency apparatus 802 processes the received information and sends the information by using the antenna 801.

The frequency band processing apparatus may be located in the baseband apparatus 803, and the method performed by the network device in the foregoing embodiment may be implemented in the baseband apparatus 803, where the baseband apparatus 803 includes a processor 804 and a memory 805.

The baseband apparatus 803 may include, for example, at least one baseband plate. A plurality of chips are disposed on the baseband plate. As shown in FIG. 8, one of the plurality of chips is, for example, the processor 804, and is connected to the memory 805, to invoke a program in the memory 805 to perform operations of the network device in the foregoing method embodiment.

The baseband apparatus 803 may further include a network interface 806, configured to exchange information with the radio frequency apparatus 802. The interface is, for example, a common public radio interface (CPRI).

Alternatively, the network device in the embodiments of this application further includes: instructions or a program stored in the memory 805 and runnable on the processor 804. The processor 804 invokes the instructions or the program in the memory 805 to perform the method executed by each module shown in FIG. 5, and achieve the same technical effects. To avoid repetition, details are not repeated herein.

The embodiments of this application further provide a readable storage medium, storing a program or instructions, the program or the instructions, when executed by a processor, implementing the processes of the foregoing embodiments of the access control method and achieving the same technical effects, which is not described herein again to avoid repetition.

The processor is the processor in the electronic device described in the foregoing embodiment. The readable storage medium includes a computer-readable storage medium, and is, for example, a read-only memory (ROM), a random access memory (RAM), a magnetic disk, or an optical disc.

The embodiments of this application further provide a chip, where the chip includes a processor and a communication interface, the communication interface is coupled to the processor, and the processor is configured to run a program or instructions of a network device, to implement the processes of the foregoing embodiments of the access control method and achieve the same technical effects, which is not described herein again to avoid repetition.

It should be understood that, the chip mentioned in this embodiment of this application may also be referred to as a system-level chip, a system chip, a chip system, a system on a chip, or the like.

An embodiment of this application further provides a computer program product, stored in a non-volatile memory, where the computer program product is executed by at least one processor to implement the processes of the embodiments of the access control method, and can achieve the same technical effects. To avoid repetition, details are not described herein again.

It should be noted that, the term "include", "comprise" or any other variation thereof herein is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. Further, it should be noted that the scope of the method and the apparatus in the implementations of this application is not limited to performing the functions in the order shown or discussed, but may further include performing the functions in a substantially simultaneous manner or in the reverse order depending on the functions involved. For example, the described method may be performed in an order different from that described, and various steps may be further added, omitted, or combined. In addition, features described with reference to some examples may be combined in other examples.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a base station, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An access control method performed by a terminal, comprising:
    receiving first information sent by a network device of a first cell; and
    performing a first operation according to the received first information, wherein the first operation comprises determining whether the first cell allows access or camping of a second-type terminal;
    wherein the first information comprises target indication information, the target indication information is used to indicate camping or access of the second-type terminal that satisfies a preset condition, wherein the preset condition comprises at least one of the following:
    a supported carrier quantity capability is less than a specific value; or
    a transmit power capability is less than a specific value;
    wherein in a case that the terminal is the second-type terminal, the method further comprises:
    performing a second operation in a case that part or all of the first information is not received, wherein
    the second operation comprises:
    prohibiting access to the first cell or prohibiting access to the first cell within a preset time.

2. The method according to claim 1, wherein the first information further comprises at least one of the following:
    a second synchronization signal block (SSB) corresponding to the second-type terminal, wherein the second SSB is configured for synchronization of the second-type terminal, and the second SSB is different from a first SSB corresponding to a first-type terminal;
    an extended information field or a reserved information field in a first main information block (MIB), wherein the first MIB is a MIB corresponding to a first-type common terminal;

extended system information; or a second SIB1 in a second system information block (SIB), wherein the second SIB1 is configured to carry system information required by a second-type terminal to access a cell in which the second-type terminal is located, and the second SIB is a SIB corresponding to the second-type terminal.

3. The method according to claim 2, wherein the extended system information comprises at least one of the following:

system information corresponding to the second-type terminal in a first SIB1, wherein the first SIB1 belongs to a first SIB, and the first SIB is a SIB corresponding to the first-type terminal;

system information corresponding to the second-type terminal in a SIBx, wherein x is an integer greater than 1, and the SIBx belongs to the second SIB; or system information corresponding to the second-type terminal in a SIBy, wherein y is an integer greater than 1, and the SIBy belongs to the first SIB.

4. The method according to claim 2, wherein in a case that the second-type terminal and the first-type terminal use a same SSB for synchronization, and the first information is the extended system information, the receiving first information sent by a network device of a first cell comprises:

receiving the extended system information after receiving the SSB for synchronization, wherein after the performing a first operation according to the received first information, the method further comprises at least one of the following:

performing, in a case that it is determined according to the extended system information that the first cell does not support a second-type terminal or does not allow camping or access of a second-type terminal, cell selection or re-selection, or prohibiting access to the first cell; or performing, in a case that it is determined according to the extended system information that the first cell supports a second-type terminal or allows camping or access of a second-type terminal, cell camping or access.

5. The method according to claim 2, wherein in a case that the first information comprises the second SSB and target information, the receiving first information sent by a network device of a first cell comprises:

receiving the second SSB; and receiving target information after receiving the second SSB for synchronization, wherein the target information comprises at least one of the following:

the extended information field or the reserved information field in the first MIB; or the second SIB, wherein after the performing a first operation according to the received first information, the method further comprises at least one of the following:

performing, in a case that it is determined according to a system message corresponding to the target information that the first cell does not support a second-type terminal or does not allow camping or access of a second-type terminal, cell selection or re-selection, or prohibiting access to the first cell; or performing, in a case that it is determined according to the system message corresponding to the target information that the first cell supports a second-type terminal or allows camping or access of a second-type terminal, cell camping or access.

6. The method according to claim 3, wherein the system information corresponding to the second-type terminal in the first SIB1 is used for indicating any one of the following:

system information supporting the second-type terminal; or system information allowing access or camping of the second-type terminal.

7. The method according to claim 3, wherein the system information corresponding to the second-type terminal in the SIBx and the SIBy is used for indicating system information required by the second-type terminal to access or camp on the cell in which the second-type terminal is located.

8. The method according to claim 1, wherein the target indication information is further used for indicating at least one of the following:

whether to allow camping or access of a terminal of a preset category;

whether to allow camping or access of a terminal of a preset type;

whether to allow camping or access of a second-type terminal in a preset application scenario;

whether to allow camping or access of a second-type terminal with preset subscription information;

whether to allow camping or access of a target terminal, wherein the target terminal is a terminal with a preset capability, a preset capability set, a preset function, or a preset function set;

random access channel (RACH) related configuration information of a second-type terminal;

access control related configuration information of a second-type terminal;

whether to support an extended discontinuous reception (eDRX) function;

search space related configuration information of a second-type terminal;

control resource set related configuration information of a second-type terminal;

reference Information related configuration information of a second-type terminal; or cell selection and re-selection related configuration information of a second-type terminal.

9. The method according to claim 8, wherein a target object of the target terminal satisfies a preset condition, wherein the target object comprises at least one of a bandwidth, a quantity of antennas, a peak rate, processing delay, a quantity of carriers, or a transmit power.

10. The method according to claim 1, wherein the target indication information is carried in a physical broadcast channel (PBCH), a MIB message, a SIB message, or the extended system information.

11. The method according to claim 1, wherein the second operation further comprises at least one of the following:

skipping accessing the first cell or disallowing an access attempt for the first cell;

performing cell selection or re-selection; or skipping camping on the first cell.

12. An access control method performed by a network device, comprising:

sending first information, wherein the first information is used by a terminal to perform a first operation, and the first operation comprises determining whether a first cell allows access or camping of a second-type terminal, wherein the first cell is a cell to which the network device belongs;

wherein the first information comprises target indication information, the target indication information is used to indicate camping or access of the second-type terminal that satisfies a preset condition, wherein the preset condition comprises at least one of the following:

a supported carrier quantity capability is less than a specific value; or a transmit power capability is less than a specific value;

wherein in a case that the terminal is the second-type terminal and that part or all of the first information is not received, the terminal performs a second operation, wherein the second operation comprises:

prohibiting access to the first cell or prohibiting access to the first cell within a preset time.

13. The method according to claim 12, wherein the first information further comprises at least one of the following:

a second synchronization signal block (SSB) corresponding to the second-type terminal, wherein the second SSB is configured for synchronization of the second-type terminal, and the second SSB is different from a first SSB corresponding to a first-type terminal;

an extended information field or a reserved information field in a first main information block (MIB), wherein the first MIB is a MIB corresponding to a first-type common terminal;

extended system information; or a second SIB1 in a second system information block (SIB), wherein the second SIB1 is configured to carry system information required by a second-type terminal to access a cell in which the second-type terminal is located, and the second SIB is a SIB corresponding to the second-type terminal.

14. The method according to claim 12, wherein the target indication information is further used for indicating at least one of the following:

whether to allow camping or access of a terminal of a preset category;

whether to allow camping or access of a terminal of a preset type;

whether to allow camping or access of a second-type terminal in a preset application scenario;

whether to allow camping or access of a second-type terminal with preset subscription information;

whether to allow camping or access of a target terminal, wherein the target terminal is a terminal with a preset capability, a preset capability set, a preset function, or a preset function set;

random access channel (RACH) related configuration information of a second-type terminal;

access control related configuration information of a second-type terminal;

whether to support an extended discontinuous reception (eDRX) function;

search space related configuration information of a second-type terminal;

control resource set related configuration information of a second-type terminal;

reference Information related configuration information of a second-type terminal; or cell selection and re-selection related configuration information of a second-type terminal.

15. The method according to claim 12, wherein the target indication information is carried in a physical broadcast channel (PBCH), a MIB message, a SIB message, or the extended system information.

16. The method according to claim 13, wherein the extended system information comprises at least one of the following:

system information corresponding to the second-type terminal in a first SIB1, wherein the first SIB1 belongs to a first SIB, and the first SIB is a SIB corresponding to the first-type terminal;

system information corresponding to the second-type terminal in a SIBx, wherein x is an integer greater than 1, and the SIBx belongs to the second SIB; or system information corresponding to the second-type terminal in a SIBy, wherein y is an integer greater than 1, and the SIBy belongs to the first SIB.

17. The method according to claim 16, wherein the system information corresponding to the second-type terminal in the first SIB1 is used for indicating any one of the following:

system information supporting the second-type terminal; or system information allowing access or camping of the second-type terminal.

18. The method according to claim 16, wherein the system information corresponding to the second-type terminal in the SIBx and the SIBy is used for indicating system information required by the second-type terminal to access or camp on the cell in which the second-type terminal is located.

19. A communication device, comprising:

a processor; and a memory storing a program or instruction that is runnable on the processor, wherein the program or the instructions, when executed by the processor, causes the communication device to perform the following steps:

receiving first information sent by a network device of a first cell; and performing a first operation according to the received first information, wherein the first operation comprises determining whether the first cell allows access or camping of a second-type terminal;

wherein the first information comprises target indication information, the target indication information is used to indicate camping or access of the second-type terminal that satisfies a preset condition, wherein the preset condition comprises at least one of the following:

a supported carrier quantity capability is less than a specific value; or a transmit power capability is less than a specific value;

wherein in a case that the communication device is the second-type terminal, the program or the instructions, when executed by the processor, further causes the communication device to perform the following step:

performing a second operation in a case that part or all of the first information is not received, wherein the second operation comprises:

prohibiting access to the first cell or prohibiting access to the first cell within a preset time.

20. A communication device, comprising:

a processor; and a memory storing a program or instruction that is runnable on the processor, wherein the program or the instructions, when executed by the processor, causes the communication device to perform the access control method according to claim 12.

* * * * *